(12) United States Patent
Guillot et al.

(10) Patent No.: US 6,751,486 B1
(45) Date of Patent: Jun. 15, 2004

(54) HANDS FREE CHARGER FOR A HANDSET AND HANDSET

(75) Inventors: Romain Guillot, Strasbourg (FR); Christian Pitisi, Lipsheim (FR)

(73) Assignee: Alcatel, Paris (FR)

( * ) Notice: Subject to any disclaimer, the term of this patent is extended or adjusted under 35 U.S.C. 154(b) by 533 days.

(21) Appl. No.: 09/670,721

(22) Filed: Sep. 28, 2000

(30) Foreign Application Priority Data

Oct. 6, 1999 (EP) .............................................. 99440270

(51) Int. Cl.$^7$ ................................................ H04B 1/38
(52) U.S. Cl. .................... 455/573; 455/575.1; 455/90.3; 379/322; 379/433; 379/449
(58) Field of Search ................................ 455/573, 572, 455/90, 568, 556, 569, 418, 575, 575.1, 347; 379/330, 322, 325, 395.61, 433.08, 428, 441, 446, 420.02, 455, 432, 395.01, 449, 328

(56) References Cited

U.S. PATENT DOCUMENTS

| 4,710,596 A | * | 12/1987 | Kurokawa | ................... 379/424 |
| 4,731,813 A |  | 3/1988 | Schroeder | |
| 4,850,006 A | * | 7/1989 | Sasaki et al. | ............... 455/571 |
| 6,108,568 A | * | 8/2000 | Lebrun et al. | .............. 455/573 |
| 6,438,229 B1 | * | 8/2002 | Overy et al. | ................. 379/446 |

FOREIGN PATENT DOCUMENTS

EP          196 33 171 A1       8/1996

\* cited by examiner

*Primary Examiner*—Cong Van Tran
(74) *Attorney, Agent, or Firm*—Sughrue Mion, PLLC

(57) ABSTRACT

The invention is a hands free charger (1) with means for electrically contact a handset (2) with a connector (5) that has a springy mean (7) and a structural mean (3, 7) as a counterpart to abduct the force of the springy mean (7).

10 Claims, 1 Drawing Sheet

HANDS FREE CHARGER FOR A HANDSET AND HANDSET

BACKGROUND OF THE INVENTION

The invention relates to a hands free charger and a handset adapted to the charger as claimed in the independent claims.

From DE 19633171 A1 an apparatus is known that comprises a charger and control for accumulator containing in the handset, for the transmission of the charging energy from the support housing to the supported handset the housing comprises inductive generators, while the handset is fitted with inductive receptors.

Preferably the inductive generators and receptors are so arranged as to lie in mutual opposition with the handset located on the support housing. At least two pairs of inductive generators and receptors are provided for transmission of the charge current or voltage.

The realization of a contact free charger is a costly solution for a set of inductive means must build in the charger and the handset.

It is also know to charge a cordless handset, for example a handset in a DECT telecommunication device, with help of a locking connector. The problem is that the handset must be pressed against the charger contacts because of the large number of contacts to be used in the hands free functions. The pressure needed is in prior art made by a locking connector which is realized in the from of a hook. The handset must be connected in a way that the handset is rotated into the hook and extracted in the same rotating way. If the user forgets this the charger is taken away—a very uncomfortable situation.

SUMMARY OF THE INVENTION

The object of the invention is to build a charger and a adapted handset that allows an easy handling of handset for charging. In parallel the pressure on the contacts must be sufficient for charging.

The invention solves the problem by using a connector without locking mean but using a mean for centering the handset in the charger. The connector on the side of the charger is pressed on the handset with a spring.

The advantage is that the centering mean is able to hold the handset against the spring force of the connector of the charger.

Other advantages are described in the dependent claims and in the following description.

DETAILED DESCRIPTION OF THE INVENTION

Figure 1:
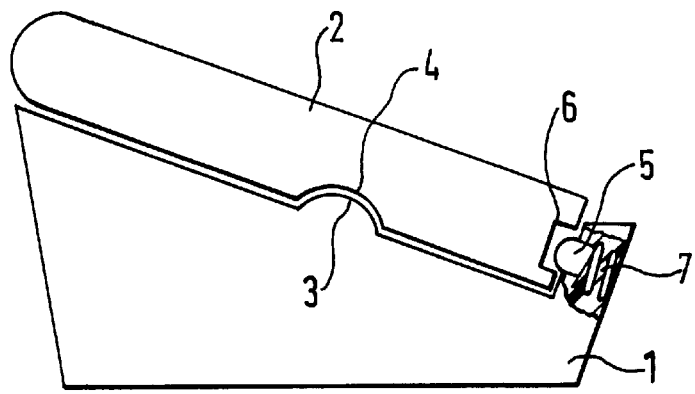
FIG. 1 shows a handset on a charger where the charger is structured to neutralize the force of the connector spring.

In FIG. 1 a handset 2 is laying in a charging station 1. The charging station has a special structure with a nose or a ridge 3. This ridge is adapted to a recess 4 of the handset 2. The handset has a connector 6 for charging its batteries. This connector is in connection with a connector 5 of the charging station 1. This connector 5 of the charging station 1 is pressed towards the connector of the handset with help of a spring 7. The force of the spring must be high enough to grant good contact between the connector parts. On the other side the force of the spring must be balanced by the force the nose or ridge of the charging station can abduct. The connector of the handset 6 can be on the surface of the handset or in a special recess. In the last case the connector of the charging station can be applied into the recess of the handset.

Figure 2:
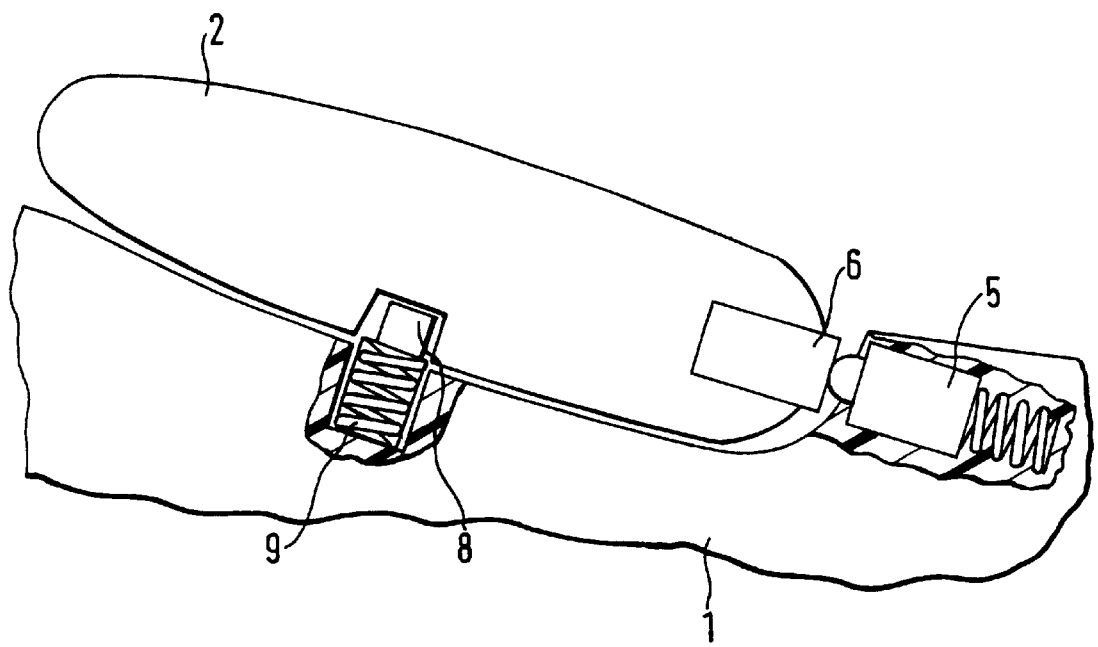
FIG. 2 a handset with a spur.

FIG. 2 shows another embodiment of the invention. The handset 2 is laying on a charging station 2. The handset is contacted by connector 6 of the handset and connector 5 of the charging station. Additionally the handset has a recess for applying a spur 8. This spur 8 is connected to a spring 9. The locking of the handset is done by the spur 8. The spur can be designed as a translating spur with the help of the spring 9.

Once locked the handset has a over stroke in the direction of the connector 6, so that is can disengage from the spur easily. The handset can not rotate in the charging station due to the spur. Scratches on the handset's shell are reduced for the spur disappears in the charging stations shell when the handset is laid on the charging station. The spring 9 is dimensioned in the way the to grant the disappearing functionality. The spur's spring 9 also suppress any possible motion of the handset when dialing a number on the handset lying on the charging station.

The inventional solution has the advantage that common connectors can be used.

What is claimed is:

1. A handsfree charger for a handset having a recess, the handsfree charger comprising:

a cradle having a resting surface, wherein the resting surface has a flat portion;

an electrical connector that is urged by a spring to contact the handset when the handset is placed in the cradle, wherein the electrical connector contacts a connector provided in the handset; and member having a shape that conforms to the recess on the handset, wherein the member is disposed on the flat portion of the resting surface of the cradle in a fixed position and opposes the force of the spring against the handset when the handset is placed in the cradle and the member engages the recess.

2. The handsfree charger as claimed in claim 1, wherein the recess provided on the handset has a curved surface.

3. The handsfree charger as claimed in claim 1, wherein the member is a ridge.

4. A handsfree charger for a handset having a recess, the handsfree charger comprising:

a cradle having a resting surface, wherein the resting surface has a flat portion;

first electrical means that is urged by a spring means to contact the handset when the handset is placed in the cradle, wherein the first electrical means contacts a second electrical means provided in the handset; and retaining means for opposing the force of the spring means against the handset when the handset is placed in the cradle and the retaining means engages the recess, wherein the retaining means has a shape that conforms to the recess on the handset and is disposed on the flat portion of the resting surface in a fixed position.

5. The handsfree charger as claimed in claim 4, wherein the recess provided on the handset has a curved surface.

6. The handsfree charger as claimed in claim 4, wherein the retaining means is a ridge.

7. A handsfree charger for a handset having a recess, the handsfree charger comprising:

a cradle having a resting surface with a recess therein;

an electrical connector that is urged by a first spring to contact the handset when the handset is placed in the cradle on the resting surface, wherein the electrical connector contacts a connector provided in the handset; and a retaining member disposed in the cradle recess, wherein the retaining member comprises a second spring for urging the retaining member into the handset recess when the handset is placed in the cradle, wherein the retaining member opposes the force of the first spring against the handset.

8. The handsfree charger as claimed in claim 10, wherein the retaining member is a stud.

9. A handsfree charger for a handset having a recess, the handsfree charger comprising:

a cradle having a resting surface with a recess therein;

first electrical means that is urged by a first spring means to contact the handset when the handset is placed in the cradle on the resting surface, wherein the first electrical means contacts a second electrical means provided in the handset, wherein the first electrical means contacts a second electrical means provided in the handset; and retaining means disposed in the cradle recess, wherein the retaining means comprises a second spring means for urging the retaining means into the handset recess when the handset is placed in the cradle, wherein the retaining means opposes the force of the first spring means against the handset.

10. The handsfree charger as claimed in claim 11, wherein the retaining means is a stud.

\* \* \* \* \*